United States Patent
Winkler

(10) Patent No.: US 8,359,958 B2
(45) Date of Patent: Jan. 29, 2013

(54) EMERGENCY BRAKING SYSTEM OF A MACHINE TOOL

(75) Inventor: Thomas Winkler, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 86 days.

(21) Appl. No.: 12/736,326

(22) PCT Filed: Mar. 31, 2009

(86) PCT No.: PCT/EP2009/053786
§ 371 (c)(1),
(2), (4) Date: Dec. 6, 2010

(87) PCT Pub. No.: WO2009/121865
PCT Pub. Date: Oct. 8, 2009

(65) Prior Publication Data
US 2011/0094359 A1   Apr. 28, 2011

(30) Foreign Application Priority Data
Mar. 31, 2008   (DE) .......................... 10 2008 000 891

(51) Int. Cl.
*B26D 7/22* (2006.01)
*F16D 51/16* (2006.01)
*F16P 3/00* (2006.01)

(52) U.S. Cl. ............................ 83/58; 192/129 R; 188/78

(58) Field of Classification Search .. 83/58; 192/129 R; 188/78, 186, 166, 184, 185, 189, 180, 162
See application file for complete search history.

(56) References Cited

U.S. PATENT DOCUMENTS

| | | | | |
|---|---|---|---|---|
| 1,811,066 A * | 6/1931 | Tannewitz | ........................ | 83/68 |
| 3,021,881 A * | 2/1962 | Edgemond, Jr. et al. | ........ | 83/438 |
| 3,469,313 A * | 9/1969 | Martin | ............................ | 30/122 |
| 3,533,357 A * | 10/1970 | Brandon | ........................ | 104/113 |
| 3,576,242 A * | 4/1971 | Mumma | ...................... | 193/35 A |
| 4,145,940 A * | 3/1979 | Woloveke et al. | ................ | 83/68 |
| 4,531,617 A * | 7/1985 | Martin et al. | .................. | 187/373 |
| 5,105,925 A | 4/1992 | Tremaglio et al. | | |
| 5,988,328 A * | 11/1999 | Newport | ...................... | 188/186 |

FOREIGN PATENT DOCUMENTS

| | | |
|---|---|---|
| CN | 101980826 | 2/2011 |
| DE | 21 47 669 | 4/1972 |
| DE | 87 08 955 | 12/1987 |
| DE | 195 36 995 | 4/1997 |

OTHER PUBLICATIONS

"Cut Stop" (VDI/VDE/IT) by Institute fuer Wekzeugmaschiner (IFW) {Institute for Machine Tools] of the University of Stuttgart.
"Cut Stop" (VDI/VDE/IT) by Institute fuer Wekzeugmaschiner (IFW) {Institute for Machine Tools] of the University of Stuttgart. Jan. 2, 2007.

* cited by examiner

*Primary Examiner* — Ghassem Alie
(74) *Attorney, Agent, or Firm* — Kenyon & Kenyon LLP

(57) ABSTRACT

An emergency braking system of a machine tool for the abrupt braking of a rotating shaft of the machine tool having at least one brake drum and at least one brake shoe, which are brought into engagement with each other in order to brake the shaft. According to the present system, the brake drum engages with the brake shoe under the influence of a centrifugal force resulting from the rotation of a shaft.

12 Claims, 6 Drawing Sheets

EMERGENCY BRAKING SYSTEM OF A MACHINE TOOL

FIELD OF THE INVENTION

The present invention relates to a protection system for a machine tool, especially for a circular saw, that deploys its protective action within a very short time span lying usually in the range of a few milliseconds, in order to protect a user of the machine tool from injury in dangerous situations.

BACKGROUND INFORMATION

At present, essentially three different approaches exist for realizing such a protection system for circular-saw benches and format circular saws which are intended to prevent a user from coming into contact with the rotating saw blade or to suffer a serious cutting injury.

The protection system of an American manufacturer, carried and marketed under the trade name Saw Stop Inc., is an emergency braking system which permits braking of the machine tool on the basis of a direct engagement of a brake actuator system with the saw blade, as soon as a suitably designed sensor has detected a dangerous situation. In this case, by the use of a hot-wire trip element, a rotatably-mounted aluminum block is pushed with the aid of a pre-loaded spring into the toothing of the operating saw blade, the aluminum block wedging itself therein, and in this manner absorbing the rotational energy of all geometries of the machine tool rotating during the sawing process. As a secondary effect, this one-sided application of force on the cutting is used to sink the saw blade into the saw bench by way of a structurally specially-designed suspension device disposed on the saw bench. With the aid of this setup, it is possible to avert serious bodily injury to the machine-tool operator triggering the protective mechanism. The disadvantage in this case is the direct attack on the working tool, thus, on the cutting geometry of the saw blade, since the breakaway of parts of the toothing creates additional danger potential for the operator. In addition, in order to restore the preparedness of the protection system, it is necessary to replace the brake unit including the saw blade by a replacement unit ready for use, which the operator must stock up, in order to be able to continue working utilizing the protection function after a braking action has taken place. This is associated with considerable resultant costs and suitable expenditure of time for procurement and installation. In addition, it may be assumed that all component parts affected by the braking process, that is, all rotating geometries of the machine tool, are subject to great stresses during the deceleration phase. Neither the manufacturer nor relevant publications concerning this system have data with regard to the long-term endurance of the device.

A further approach pursues the use of a protection system exclusively for sinking the saw blade into the saw bench without initiating a procedure for braking the saw blade. In this case, with the aid of a pyrotechnic priming charger, the saw blade, including the main shaft and its bearing, is moved out of the danger zone, so that serious injuries to the operator may be prevented. The disadvantage in this type of protection system is the necessity of moving relatively large masses in the form of assemblages to be lowered, under strict time requirements in the millisecond range. Furthermore, the pyrotechnic igniters thereby necessary, which prove to be imperative for this protection actuator system, give rise to a costly part reversibility which limits, both timewise and organizationally, an immediate continuation of work on the machine tool with a protection system ready for use. Furthermore, for reasons of limited space and very specific procedure, this protection system is only suitable for larger stationary devices like, for example, circular-saw benches which permit such a structure in their interior. However, this system has to be ruled out for use on smaller, hand-guided devices such as cross-cut and miter saws or panel saws.

A disclosure from a publicly sponsored project by the name of "Cut-Stop" (VDI/VDE/IT) with respect to a protection system for format circular saws by the Institute für Werkzeugmaschinen (IFW) (Institute for Machine Tools) of the University of Stuttgart describes an approach which, with the aid of a special form of a disk brake system, namely, a self-amplifying wedge brake, brings the main shaft of the machine tool and therefore the saw blade to a standstill. In this case, a wedge is accelerated with the aid of a pyrotechnic igniter and subsequently pushed between a stationary wedge guide in the form of a modified brake caliper and the rotating brake disk. For the selection and combination of specific wedge angles $\alpha$ and brake-lining values $\mu$, the system works in self-locking fashion, so that the specific time demands on the braking procedure may be fulfilled with this design as a function of the mass inertia to be decelerated. However, the disadvantage of this protection system lies in the fact that in this case as well, as described in the cited publication, subsequent to the triggering of the protection actuator system, it is necessary to replace the complete braking unit because of the wedge jammed in the friction pairing. The expenditure of time needed for the scope of work to be carried out amounts to approximately 10-12 minutes for the complete restoration of the system preparedness. Therefore, a partial restriction of the immediate system reversibility holds true here, as well.

DE 195 36 995 A1 discusses a fail-safe brake for elevators which has a device that, in the event a predefined maximum speed of the means of transport is exceeded, brakes the drive with a speed-dependent deceleration and possibly also stops it. The fail-safe brake of DE 195 36 995 A1 acts directly, as a function of rotational speed, on the driving disk of the cable-operated conveying system and is able to limit its rotational speed. The fail-safe brake in the form of a centrifugal brake additionally has a device for amplifying the braking force as a function of the conveying speed.

Starting from this related art, the object of the present invention is to provide a protection system for a machine tool having an alternative design that deploys its protective action within a few milliseconds, and at least partially eliminates the problems described at the outset.

Summary of the Invention

To achieve this objective, the exemplary embodiments and/or exemplary methods of the present invention provides an emergency braking system for the abrupt braking of a rotating shaft of a machine tool, the emergency braking system having a brake drum and at least one brake shoe which are brought into engagement with each other in order to brake the shaft. According to the exemplary embodiments and/or exemplary methods of the present invention, the brake drum and the at least one brake shoe are designed and disposed in such a way that the brake drum engages with the brake shoe under the influence of the centrifugal force or centrifugal acceleration resulting from the rotation of the shaft.

Therefore, the exemplary embodiments and/or exemplary methods of the present invention is targeted toward the deceleration of the rotating shaft of the machine tool, which may be a circular-saw bench, a cross-cut and miter saw or a panel saw, for example, by using the available rotational energy of the rotating shaft with the aid of the design of a self-amplifying or self-locking friction pairing.

In this context, it should be clear that the triggering of the braking procedure, which, for example, takes place as response to an output signal of a sensor that detects a dangerous situation for the user, may be accomplished mechanically, electromechanically, pyrotechnically, pneumatically or hydraulically, and in principle, is not tied to any specific medium; however, an electromechanical triggering may be used because of a simple design and very good reversibility.

When braking the machine tool, advantageously there is no direct intervention in the tool. Such an intervention would inevitably be associated with the destruction of the tool. The machine tool of the present invention brakes the shaft that directly or indirectly is driving the tool. In this manner, the tool itself remains undamaged.

The desired, brief braking time using the centrifugal acceleration of at least one braking partner may be optimized by the exact adjustment of the friction needed for the braking. At least one or perhaps also both braking partners, i.e., brake drum and/or brake shoe(s), advantageously has/have a friction lining which increases the fiction and thereby amplifies the braking action and reduces the braking time. In this context, the friction pairing and its functionality depend decisively on the selection of the materials for the friction partners.

It must be taken into consideration that in the present case, emergency brakings are involved which do not fall within the scope of the ordinary machine operation, and therefore occur very seldom. However, at the moment a case of emergency occurs, the sharpest possible deceleration of the shaft and therefore of the tool should be initiated, which means likewise any requirements for a possible controllability of the braking action or, for example, low abrasion characteristics of the friction pairing, as is typically the case in other fields of application, do not apply.

Thus, it can be seen that because of this desired deceleration characteristic and the material selection resulting therefrom, friction pairings result which differ from those in ordinary friction brakes, e.g., those in the vehicle sector, since the demands on the braking performance are different there. In this manner, the predefined timeframe of the braking, which lies in the range of a few milliseconds, may be ensured. The form of the brake according to the present invention allows the braking of a tool, driven directly or indirectly by a shaft, within very short times typically in the range of 1 to 50 ms, advantageously in the range of 1 to 20 ms and particularly in the range of 10 ms and less.

The material of the friction partners must be selected so that the resulting friction pairing is closely coordinated with the geometry of the overall system. In the special case of the present braking device of a machine tool, this means that the attainable coefficients of friction μ must be as great as possible so as, in the case of a given geometry of the main components, to achieve the best possible decelerations in the range of a few milliseconds.

This is achieved in an advantageous manner in that at least one lining zone, which has self-locking properties, develops on the brake lining.

Because of the brakings initiated in this manner, great stresses therefore result on the linings and brake drum, so that for reasons of limited space, the drum in the present case is advantageously to be made of steel or a similarly stressable material. In order to nevertheless have an influence on the material of both friction partners, at least one of the braking partners—advantageously both, however—is/are provided with a friction lining. Thus, from the technical standpoint, it may be useful, for example, to install a friction insert, e.g., in the form of a friction ring made of materials described in greater detail below, within the brake drum.

This friction ring, for example, may be pressed in and/or clamped or similarly secured in order to permit a permanent connection to the brake drum, and therefore to support the loads occurring. In order to absorb the forces occurring in the case of braking, a slot/key connection of the brake drum and friction ring is also possible.

The brake shoes of the system, which typically are likewise made of steel, advantageously have a friction lining. The friction lining, e.g., a sintered material made particularly of the material MD517, may be stuck on, screwed on or perhaps also fixed reliably in place on the brake shoes by other securing methods such as slot and key, for instance. In order to be able to absorb the forces occurring in the case of braking on the brake-shoe side as well, the brake lining may be protected by way of a support on the brake shoe against a shift contrary to the direction of movement of the brake shoe.

It is useful that the friction or braking partners have friction surfaces made of different materials. The following materials and all material pairings of the friction partners resulting from them are regarded as promising for the use indicated above:

Sintered lining (e.g., MD517)
Aluminum soft (e.g., Al 24b249)
Aluminum hard (e.g., Al 1a2)
Polyamide PA6.6 glass-fiber reinforced
Polyamide PA12
Polyamide POM
Polyurethane
Organic friction lining
Copper
Brass In this context, it is advantageous that the friction lining of the friction partner on the brake-drum side has a harder material than the friction partner on the brake-shoe side. Thus, for example, the use of sintered linings made of the material MD517 on aluminum is a suitable combination. In this case, the friction ring of the brake drum could be made of aluminum, and one or more brake shoes could have a sintered lining made of MD517.

However, the opposite set-up is conceivable as well.

According to one development of the exemplary embodiments and/or exemplary methods of the present invention, the at least one brake shoe is swivel-mounted on a brake-shoe holder that is disposed on the rotating shaft and rotates with it. A locking device may be provided which is adjustable between a locked position in which the brake shoe is retained on the brake-shoe holder, and an unlocked position in which the at least one brake shoe is released in such a way that it executes a swiveling motion in the direction of the brake drum in order to produce the braking engagement. In other words, the at least one brake shoe rotating with the rotating shaft is moved, utilizing the centrifugal force of the rotating shaft, abruptly within a few milliseconds in the direction of the stationary brake drum, as soon as the locking device is transferred into its unlocked position.

The locking device may include at least one locking element which is movable between a locked position in which it is engaged with the at least one brake shoe, and an unlocked position in which it is decoupled from the brake shoe. For instance, such a locking element may take the form of a locking pin or the like.

The locking device advantageously includes an actuator which transfers the locking device out of the locked position into the unlocked position. For example, this actuator may be a magnet actuator which pulls a ring armature to which a locking element in the form of a locking pin is attached, in order to disengage the locking pin from the brake shoe so that the brake shoe is released.

In addition, the emergency braking system may include a coupling device which is provided in such a way that in its coupled position, it connects the shaft to be braked to a drive train, and during an emergency braking, is automatically transferred into its decoupled position in which the drive shaft to be braked is decoupled from the drive train. Such a decoupling of the drive train during an emergency-braking process ensures that the drive train, which, for example, may have a drive shaft and any gear steps, is excluded from the actual braking procedure, which means the drive train is not subject to the great deceleration torques occurring during the braking procedure. This brings the advantage first of all, that components of the drive train cannot be damaged due to the braking process. Secondly, the geometries of the components on the drive end do not have to be adapted structurally to the requirements of the braking procedure, which is why they may be produced in a less robust and more inexpensive manner. In addition, a profitable reduction in the mass moment of inertia to be decelerated results, since the components of the drive train do not have to be braked. Thus, the system load during the deceleration phase may be reduced decisively. Accordingly, the period of time necessary for braking the saw blade may be shortened substantially, while retaining the same action of force. Alternatively, the action of force may naturally also be reduced, accompanied by unaltered braking period.

According to one embodiment, the shaft to be braked is in the form of a hollow shaft, in whose hollow space a drive shaft of the drive train is positioned. In this case, the coupling device is advantageously formed by a protrusion, provided on the at least one brake shoe, which in the coupled position, grabs through a through-hole, provided in the shaft to be braked, into a cutout in the drive shaft, so that the drive shaft and the shaft to be braked are joined in torsionally fixed fashion to each other, and which in the decoupled position, disengages from the cutout in the drive shaft, so that the shaft to be braked is no longer driven by the drive shaft. In this manner, the drive train may be decoupled during the braking process. The protrusion may engage with the cutout with form locking, a reliable engagement of the protrusion in the cutout thereby being attained. To this end, the protrusion may be arched, for example, and the cutout may be prism-shaped.

At this point, it should be pointed out that the number of protrusions does not have to correspond to the number of cutouts. So, for example, four cutouts and only two protrusions may be provided. This is advantageous in that, after an activation of the emergency braking system, the drive shaft only has to be rotated slightly in order to position the protrusions in a pair of cutouts again. It is also possible to provide more than two brake shoes, of which only two, however, must be fastened to the drive shaft via corresponding connections formed from one protrusion and one cutout.

In addition, the emergency braking system of the present invention may have a resetting device for moving the at least one brake shoe back into its original position, in order to ensure a complete system reversibility after a braking procedure has taken place. The resetting device is designed to be closely coordinated with the self-amplification of the friction pairing, and therefore with the geometry of the braking system. For example, the resetting device may be realized by the use both of suitably dimensioned tension-spring elements as well as compression-spring elements.

In addition, the exemplary embodiments and/or exemplary methods of the present invention relates to a machine tool having an emergency braking system of the type described above, the machine tool may be a circular saw, more precisely, a circular-saw bench, a cross-cut and miter saw or a panel saw.

However, it should be clear that the braking system of the present invention is also usable on other machine tools which, on specific occasion, have to rely on a purposefully triggerable deceleration within a given time frame in the range of a few milliseconds. Thus, in principle, an adaptation of this invention to another machine tool is possible in the individual case.

In the following, an exemplary specific embodiment of the present invention is described in greater detail with reference to the accompanying drawing.

DETAILED DESCRIPTION

Figure 1:
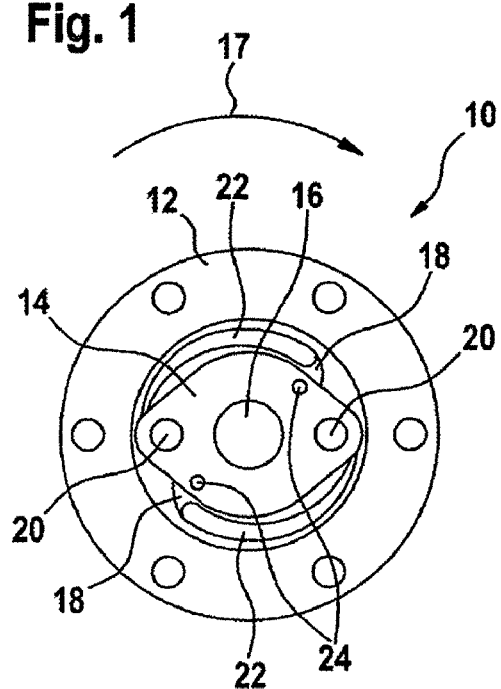
FIG. 1 shows a schematic front view of an emergency braking system according to one specific embodiment of the present invention in a state in which the braking procedure has not been triggered.
Figure 2:
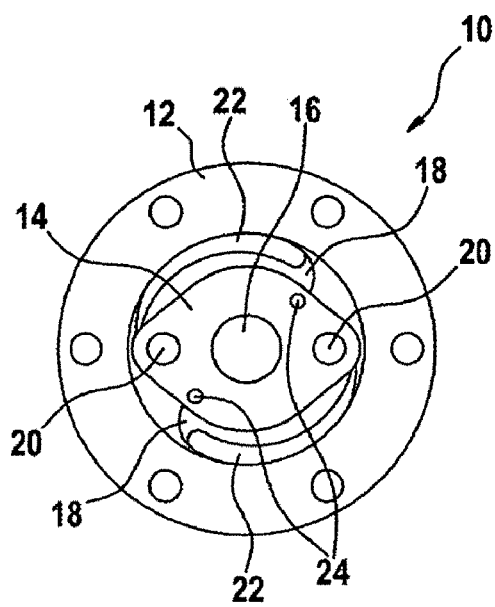
FIG. 2 shows a schematic front view of the emergency braking system depicted in FIG. 1 in a state in which the braking procedure has been triggered.

FIGS. 1 through 6 show schematic views of an emergency braking system according to one specific embodiment of the present invention, which overall is denoted by reference numeral 10, and which is used, for example, to bring a saw blade of a circular-saw bench (not shown here, see rather FIGS. 9 and 10) to a standstill in a dangerous situation within a very short period of time in the range of a few milliseconds. Emergency braking system 10 includes a stationary brake drum 12 which is secured to a frame component (not further shown) of the circular-saw bench. This frame component must be designed structurally in such a way that it withstands the braking torques developing during the deceleration phase and is able to absorb them.

Emergency braking system 10 also includes a brake-shoe holder 14 which is fixedly joined to a driven shaft 16 on the saw-blade side, so that it rotates with it in the direction of rotation identified by arrow 17. Secured to brake-shoe holder 14 are two brake shoes 18, situated diametrically opposite each other, which in each case are mounted in a manner allowing rotation about a swivel pin 20. Each brake shoe 18 is provided with a friction lining 22 on its surface facing brake drum 12, these friction linings 22 engaging with stationary brake drum 12 during a braking procedure of emergency braking system 10, so that friction linings 22 and brake drum 12 form a friction pairing. Brake drum 12 itself may also have a friction lining 22, whose material, however, must not be identical to the material of friction linings 22 of brake drum 12.

In the state shown in FIG. 1, in which the braking procedure has not yet been triggered, brake shoes 18 are retained securely on brake-shoe holder 14 with the aid of locking pins 24, so that they are unable to rotate about swivel pins 20.

Figure 3:
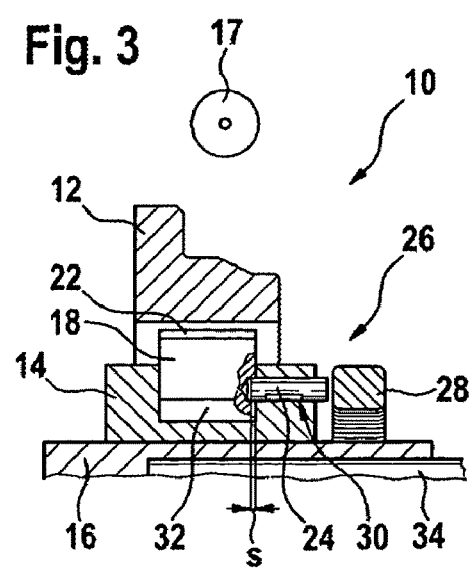
FIG. 3 shows a longitudinal-section view of the emergency braking system depicted in FIGS. 1 and 2 in a state in which the braking procedure has not been triggered.

These locking pins 24 are part of a locking device 26 which also has a magnet actuator 28 by which locking pins 24 are adjustable between a locked position in which brake shoes 18 are retained on brake-shoe holder 14, and an unlocked position in which brake shoes 18 are released in such a way that they execute a swiveling motion around their swivel pins 20 in the direction of brake drum 12, in order to produce the braking engagement between friction linings 22 and brake drum 12. As FIG. 3 shows, magnet actuator 28 of locking device 26 is fastened securely on driven shaft 16. Alternatively, magnet actuator 28 may also be secured on a stationary housing part (not shown), and act in non-contact fashion on locking pins 24. Locking pins 24, which are movable back and forth by magnet actuator 28, extend through through-holes 30 provided in brake-shoe holder 14, and in the state shown in FIGS. 1, 3 and 5 in which the braking procedure has not yet been initiated, engage in engagement openings 32 provided in each brake shoe 18. In this manner, brake shoes 18 are retained on brake-shoe holder 14. In the event the braking system is triggered, magnet actuator 28 pulls a ring armature, on which locking pins 24 are secured, by a defined disengaging distance s out of brake-shoe holder 14, and thus releases brake shoes 18, see FIG. 4. As a result of the centrifugal forces or the centrifugal acceleration generated by rotating driven shaft 16, they come to lie against stationary brake drum 12, the friction pairing between friction linings 22 of brake shoes 18 and brake drum 12 needed to decelerate driven shaft 16 thereby being formed. Even though in the present exemplary embodiment, locking pins 24 are moved back and forth with the aid of magnet actuator 28, it should be pointed out that as an alternative, locking pins 24 may also be moved in one of the two moving directions under the influence of a spring force or the like. Thus, the forward motion of locking pins 24 may take place under the influence of magnet actuator 28, while locking pins 24 are reset by one or more spring elements, or vice versa.

Amplification factor C* of the design is defined as a function of its geometrical dimensions; for the present set-up, it must lie in the area of the self-amplification or the self-locking of the system. For this case, only a short impulse is needed to form the friction pairing, since brake shoes 18 are pressed against brake drum 12 as a result of the force balance occurring.

Because of the critical time requirements of the indicated braking system, it seems expedient, inter alia, to select a concept which permits the use of the technical principle of self-help. This means that tensioning force $F_{Sp}$ introduced for the triggering is amplified within the system by a multiple, with generated reaction force $F_{Reakt}$, here in the form of a frictional force $F_R$, in turn contributing to the increase of initiated tensioning force $F_{Sp}$. This property is also called self-amplification or servo effect. In principle, the systems thereby characterized yield the lowest possible deceleration times using low tensioning forces, so that both the mass of the triggering members as well as triggering time $t_A$ needed may be minimized.

Furthermore, amplification factor C* is defined as follows:

$$C^* = \frac{F_R}{F_{SP}} = \frac{\mu \cdot \tan\alpha}{\tan\alpha - \mu}$$

If factor C* is positive, then the forces act in the sense of direction assumed in the drawing. In this context, frictional force $F_R$ is yielded from tensioning force $F_{Sp}$ amplified by factor C*. For =tan, the equation has a pole for C*, so that this amplification factor tends to infinity. In this regard, the system state of an unstable balance virtually prevails. A negative amplification factor C* is obtained for the selection of the parameter tan <. This means a theoretical reversal of the sense of direction of tensioning force $F_{Sp}$, which would have to occur in order to maintain the force balance. In reality, this case indicates a special state of a self-amplifying system. In addition, the friction pad is pressed here against the moving belt by resulting frictional force F. Because of the steady, mutual increase in the frictional and normal forces thus developing, in the ideal case, static friction occurs within the friction pairing after a brief time. This leads as a result to the locking of the entire system. In this connection, one usually speaks of self-locking. In this context, forces advantageously occur which are greater than the forces imparted by the centrifugal force of the brake shoes.

As a function of relative coefficient of friction of the friction partners, angles α are thus obtained which denote areas in which self-amplification or self-locking occur.

Figure 4:
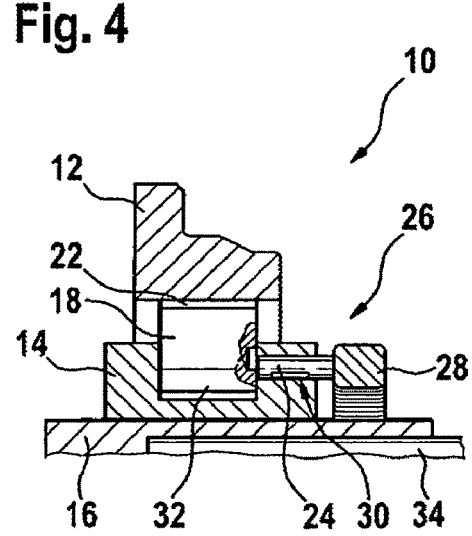
FIG. 4 shows a schematic longitudinal-section view of the emergency braking system depicted in FIGS. 1 to 3 in a state in which the braking procedure has been triggered.
Figure 5:
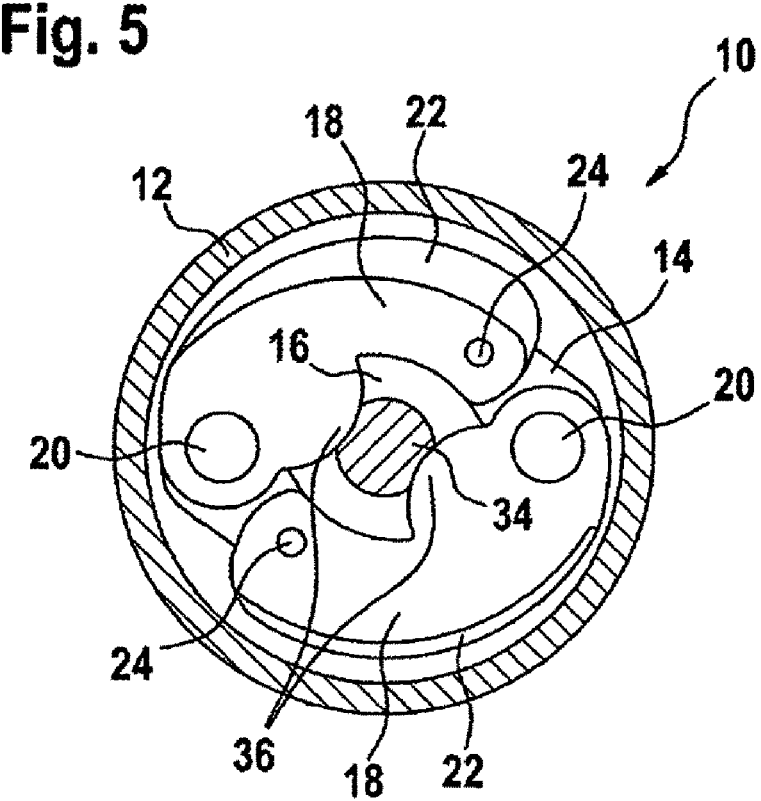
FIG. 5 shows a schematic cross-sectional view of the emergency braking system depicted in FIGS. 1 to 4 in a state in which the braking procedure has not been triggered.
Figure 6:
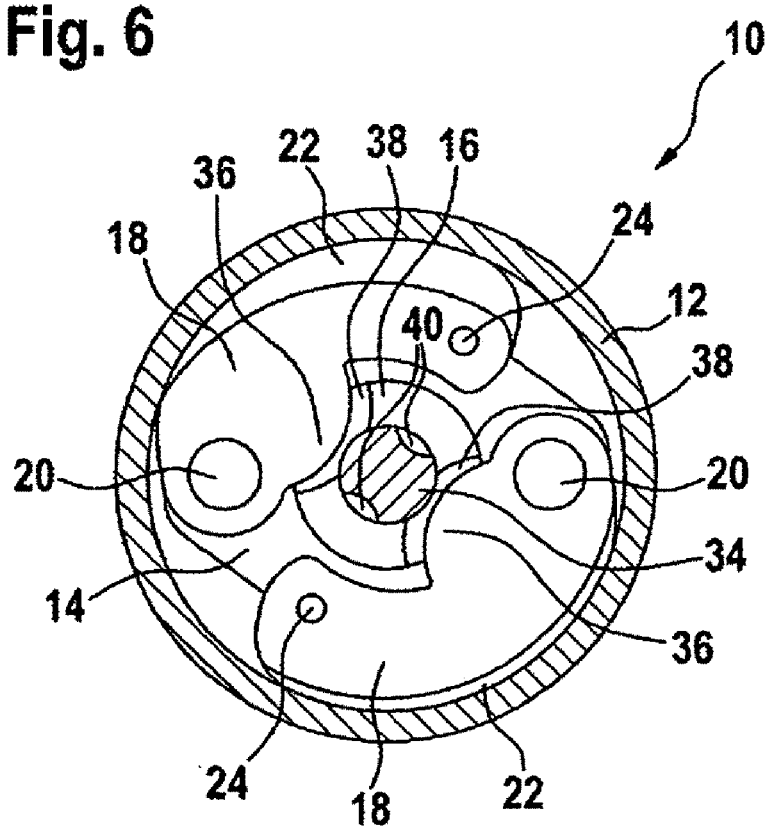
FIG. 6 shows a schematic cross-sectional view of the emergency braking system depicted in FIGS. 1 to 5 in a state in which the braking procedure has been triggered.

As shown particularly in FIGS. 3 and 4, driven shaft 16 to be braked with the aid of emergency braking system 10 is in the form of a hollow shaft, in whose hollow space a drive shaft 34 is accommodated which forms a part of the drive train (not shown). In order to connect driven shaft 16 and drive shaft 34 in torsionally fixed manner to each other, arched protrusions 36 jutting out in the direction of the midpoint of driven shaft 16 and drive shaft 34 are formed on brake shoes 18 and in each case reach through through-holes 38, which are provided in driven shaft 16, and engage in prism-shaped cutouts 40 in drive shaft 34, as shown in FIG. 5. Due to the engagement of protrusions 36, provided on brake shoes 18, in corresponding cutouts 40 in drive shaft 34, driven shaft 16 and drive shaft 34 are joined to each other in torsionally fixed fashion. If the braking procedure is initiated starting from the state shown in FIG. 5, then after locking pins 24 have been pulled out of brake shoes 18 by disengaging distance s, brake shoes 18 rotate about their respective swivel pins 20 in the direction of brake drum 12, so that protrusions 36 disposed on brake shoes 18 become disengaged from assigned cutouts 40 of drive shaft 34, drive shaft 34 thereby being decoupled from driven shaft 16. Due to this decoupling, the drive train is not subject to the deceleration torques generated during the braking procedure, so that it cannot be damaged. In addition, it is possible to construct the components of the drive train to be less robust, since they are not subject to any great stresses during the braking procedure. Thus, for example, the cross-section of drive shaft 34 on the motor side may be designed to be smaller than when no decoupling device is provided to decouple the drive train. However, the advantage resulting from this, that the number of components to be decelerated is reduced to a minimum, is decisive. This has a positive effect on the system load during the deceleration phase, as was already described before.

Because of the design of emergency braking system 10 described above, the period for the triggering time of the braking procedure may be shortened sharply, since the braking engagement between brake drum 12 and brake shoes 18 takes place under the influence of the centrifugal force or centrifugal acceleration which results from the rotation of driven shaft 16.

In addition, the design shown in FIGS. 1 through 6 realizes an electromechanical system without the use of further energy forms which would possibly jeopardize the complete reversibility and would mean a limitation for it.

Because of the use of a two-sided application of the frictional peripheral force of the friction pairing, the present roller bearings used are protected and do not have to be redesigned or even newly designed due to concerns of the durability of the overall system, whereby in turn an increased mass inertia would be introduced into the system.

Due to a design as described in the present case, in addition, rotating external geometries of the brake unit are avoided, which means an easy-to-encase, closed system having a compact construction may be realized, that additionally fits in positively as regards the special concerns of occupational safety in dealing with machine tools.

It should be clear that magnet actuator 28 is activated by output signals of suitable sensors which detect a condition in which an operator is coming dangerously close to the saw blade of the circular-saw bench. Sensors of this kind are known in the related art, which is why they were not discussed in greater detail in the present description. Radar sensors, particularly UWB radar sensors (UWB=Ultra Wide Band), as well as optical sensors, particularly NIR systems (NIR=Near Infra Red) are named here illustratively and not definitively.

Figure 7:
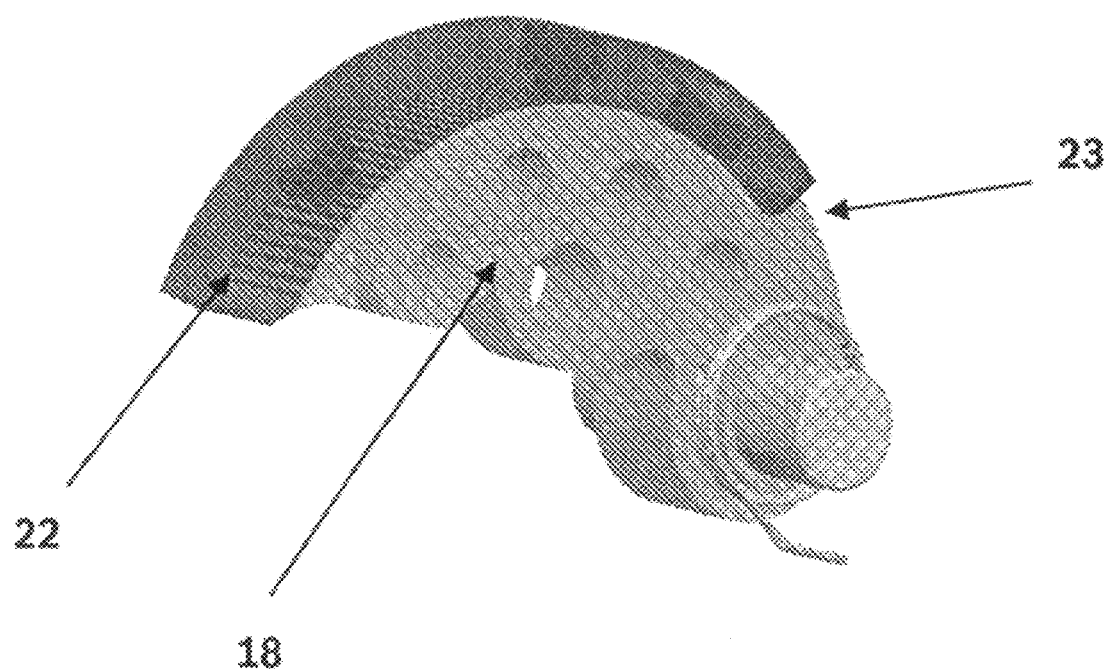
FIG. 7 shows a brake shoe of the emergency braking system according to the present invention having a friction lining.

By way of example, FIG. 7 shows brake shoe 18 of an emergency braking system 10 according to the present invention having a friction lining 22. Brake shoes 18 of system 10, which typically are likewise made of steel, have a friction lining 22 may be made of a different material than brake shoe 18 itself. Friction lining 22, e.g., a sintered material, especially of the material MD517 if the brake lining of drum 12 should be aluminum, may be stuck on, screwed on, or perhaps also reliably fixed in position on brake shoes 18 by other securing methods such as slot and key, for instance. In order to be able to absorb the forces occurring in the case of braking on the brake-shoe side as well, the brake lining may be protected by way of a support 23 on brake shoe 18 against a shift contrary to the direction of movement of the brake shoe.

Figure 8:
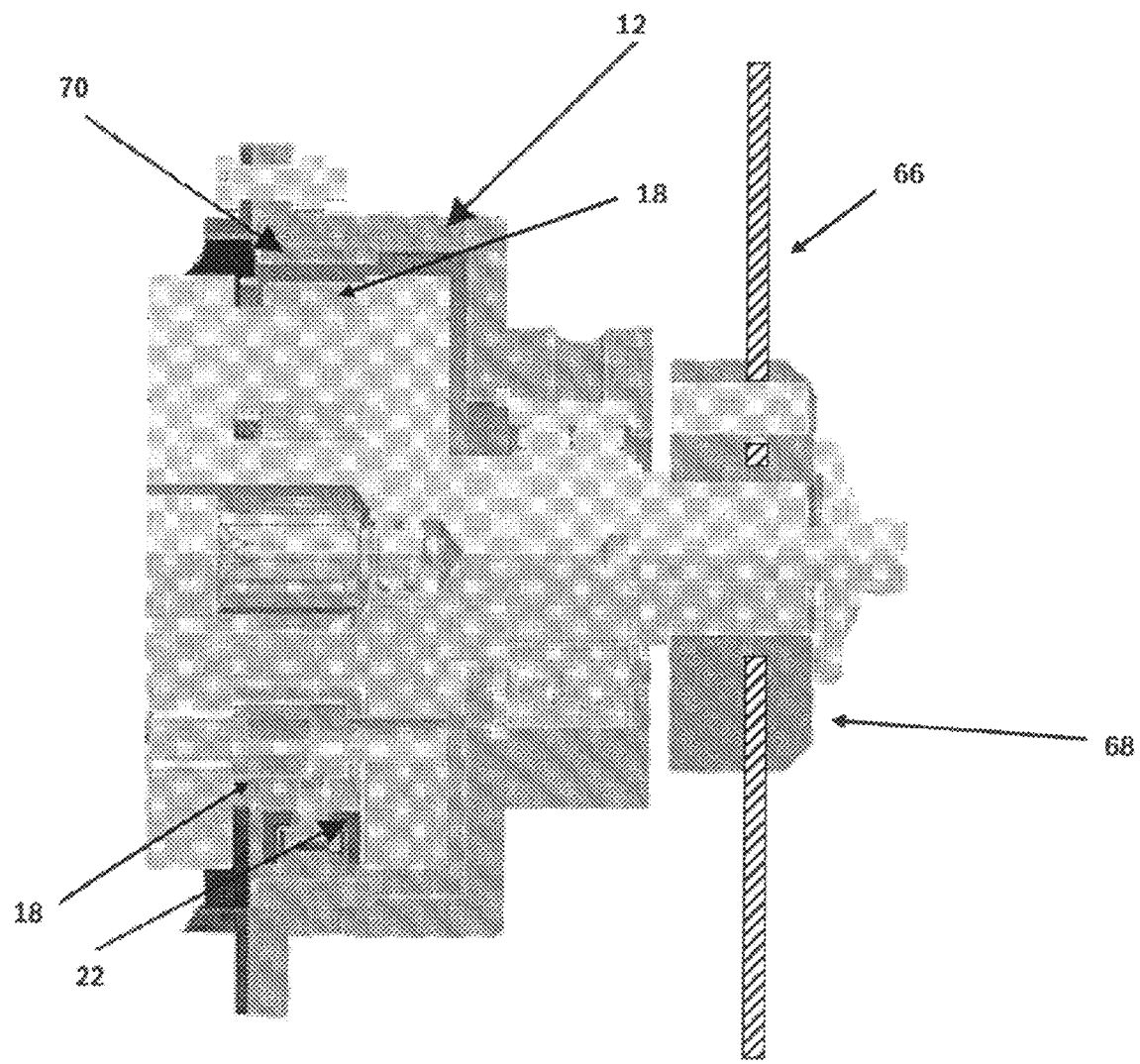
FIG. 8 shows a schematic cross-sectional view of a specific embodiment of the emergency braking system according to the present invention for a circular saw.

FIG. 8 shows emergency braking system 10 according to the present invention of a circular saw in a schematic sectional drawing. Saw blade 66 is clamped via a clamping device 68 onto a driven shaft 16 of an electric motor (not further shown) and is driven by this shaft. Rotating with shaft 16 are brake shoes 18, which are secured in the locked state of the system and are not propelled outwardly by the centrifugal force or centrifugal acceleration, that is, in the direction of brake drum 12 attached to the housing. Brake drum 12 is provided on the inner side with a pressed-in friction ring 70, for example, made of aluminum. In the application case, which is detected by a suitable sensor system, the locking pins of brake shoes 18 are released, so that at this point, brake shoes 18 are propelled against the inner side of the brake drum due to the centrifugal force. Brake shoes 18 then interact with friction ring 70 of brake drum 12. In order to increase the friction and therefore the braking action and to shorten the braking time, brake shoes 18 have a friction lining 22 made, for example, of a sintered material of the material MD517.

Figure 9:
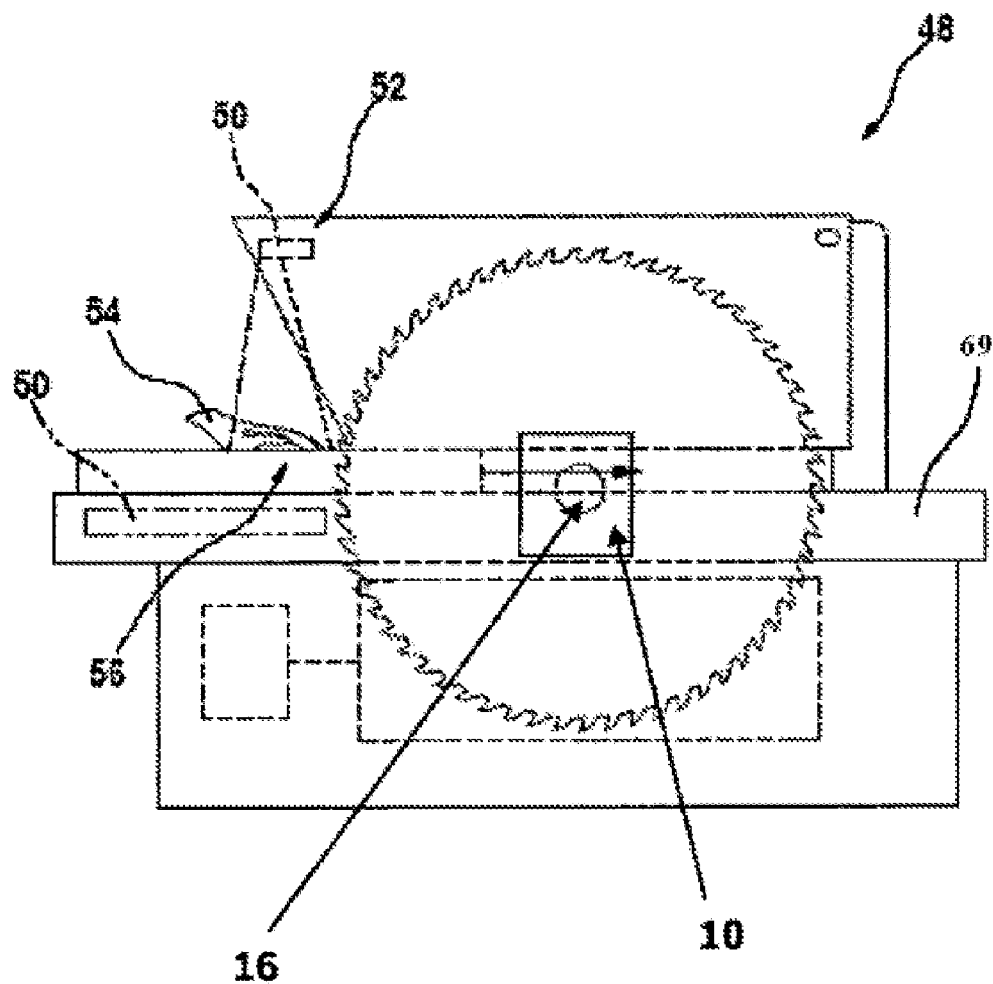
FIG. 9 shows a side view of a circular-saw bench having a braking device according to the present invention as one possible exemplary embodiment of a machine tool according to the invention.
Figure 10:
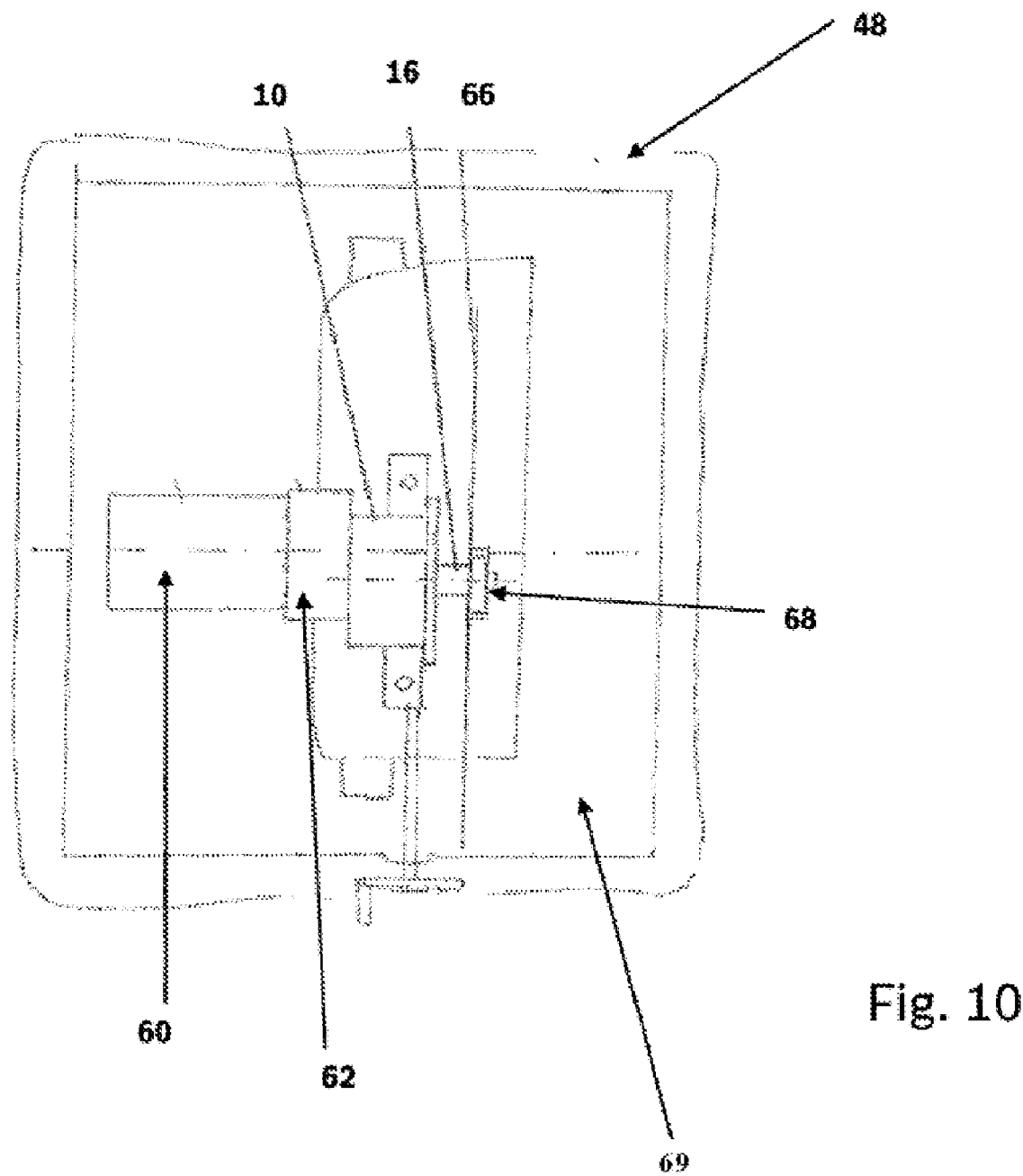
FIG. 10 shows the circular-saw bench according to FIG. 8 in a top view.

FIGS. 9 and 10 show an exemplary embodiment of a machine tool according to the present invention, having an emergency braking system 10 and a sensor system 52 for detecting the presence of a type of material, particularly tissue like the human tissue of a hand. Circular saw 48 of FIG. 9, shown in a side view, is a circular-saw bench (benchtop system) and has a detection device 52 which is provided to detect the presence of a material type 54, particularly of tissue, for example, in a machine-tool working area 56. Device 52 for the detection has at least one sensor 50 that may be installed in a plane above the working area of the machine tool, as indicated in FIG. 9. Alternatively, sensor 50 of device 52 may also be integrated directly in workbench 69. Both possibilities may be realized both individually and simultaneously, as illustrated by way of example in FIG. 9. Device 52 for the detection especially of human tissue, but also of other materials, may include illustratively, and not definitively, radar sensors, particularly UWB radar sensors (UWB=Ultra Wide Band) and/or also optical sensors, particularly NIR systems (NIR=Near Infra Red).

Upon detection of a hand 54, for example, in the danger zone directly in front of the saw blade of the machine tool, an activity signal is generated which releases the locking pins of the brake shoes so that—as described in detail above—put in motion by the centrifugal force, they are propelled against brake drum 12 and initiate the braking process.

FIG. 10 shows the exemplary embodiment of circular-saw bench 48 in a side view. A motor 60, by way of a gear unit 62, drives a tool which, in the exemplary embodiment of FIG. 10, is a saw blade 66. Saw blade 66 is secured on a driven shaft 16 by a clamping device 68. Emergency braking system 10 is disposed advantageously between gear unit 62 and shaft 16, that is, it is made possible in the event of activation, to decouple shaft 16 from driving gear unit 62. In the case of an emergency braking, an overloading of the gear stage is thereby avoided. The gear stage and motor shaft are then consequentially decoupled from each other.

Even though a circular saw was selected as an example of a machine tool for the specific embodiment described above, it should be clear that the principle of the exemplary embodiments and/or exemplary methods of the present invention is applicable to other machine tools, as well.

Finally, it should be clear that the specific embodiment of the emergency braking system according to the present invention described above is in no way restrictive. Rather, modifications and alterations are possible without departing from the scope of protection of the present invention, which is defined by the accompanying description herein.

What is claimed is:

1. An emergency braking system of a machine tool for abrupt braking of a rotating shaft of the machine tool, comprising:
   at least one brake drum;
   at least one brake shoe, wherein the at least one brake drum and the at least one brake shoe are brought into engagement with each other in order to brake the rotating shaft;
   wherein the brake drum engages with the brake shoe under the influence of a centrifugal force resulting from the rotation of the rotating shaft, wherein the rotating shaft stops within 50 ms,
   wherein at least one of the brake drum and brake shoe has a friction lining,
   wherein the friction lining of the at least one of the brake drum and brake shoe is selected from materials which include at least one of sintered lining, soft aluminum, hard aluminum, polyamide, particularly polyamide PA6.6 glass-fiber reinforced, polyamide PA12, polyamide POM, polyurethane, copper, brass, and organic material.

2. The emergency braking system of claim 1, wherein at least one lining zone which has self-locking properties develops on the friction lining.

3. The emergency braking system of claim 1, wherein the friction lining of the friction partner on the brake-drum side has a harder material than the friction partner on the brake-shoe side.

4. The emergency braking system of claim 1, wherein the brake drum has a friction ring whose material differs from the material of the drum.

5. The emergency braking system of claim 4, wherein the friction ring of the brake drum is made of an aluminum material.

6. The emergency braking system of claim 4, wherein the friction lining of at least one of the brake shoes is made of a sintered material of the material MD517.

7. The emergency braking system of claim 1, further comprising:
a securing arrangement to secure the friction lining on the brake-shoe holder.

8. The emergency braking system of claim 1, wherein the at least one brake shoe is swivel-mounted on a brake-shoe holder, which is disposed on the rotating shaft and rotates with it.

9. The emergency braking system of claim 7, further comprising:
a locking device which is adjustable between a locked position in which the brake shoe is retained on the brake-shoe holder, and an unlocked position in which the at least one brake shoe is released so that the brake shoe executes a swiveling motion in the direction of the brake drum to produce the braking engagement.

10. The machine tool of claim 9, wherein the machine tool is a circular-saw bench.

11. The emergency braking system of claim 1, wherein both of the brake drum and the brake shoe have a friction lining.

12. A machine tool comprising: an emergency braking system of a machine tool for abrupt braking of a rotating shaft of the machine tool, including:
at least one brake drum;
at least one brake shoe, wherein the at least one brake drum and the at least one brake shoe are brought into engagement with each other in order to brake the rotating shaft;
wherein the brake drum engages with the brake shoe under the influence of a centrifugal force resulting from the rotation of the rotating shaft, wherein the rotating shaft stops within 50 ms,
wherein at least one of the braking partners has a friction lining,
wherein the friction lining of at least one braking partner is selected from materials which include at least one of sintered lining, soft aluminum, hard aluminum, polyamide, particularly polyamide PA6.6 glass-fiber reinforced, polyamide PA12, polyamide POM, polyurethane, copper, brass, and organic material.

* * * * *

UNITED STATES PATENT AND TRADEMARK OFFICE
CERTIFICATE OF CORRECTION

PATENT NO.       : 8,359,958 B2
APPLICATION NO.  : 12/736326
DATED            : January 29, 2013
INVENTOR(S)      : Thomas Winkler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 154 days.

Signed and Sealed this

First Day of September, 2015

Michelle K. Lee
*Director of the United States Patent and Trademark Office*